(12) United States Patent
Davis

(10) Patent No.: US 11,160,374 B1
(45) Date of Patent: Nov. 2, 2021

(54) HEIGHT AND ANGLE ADJUSTABLE COMMERCIAL SHELVING

(71) Applicant: Raymond E Davis, Heath, TX (US)

(72) Inventor: Raymond E Davis, Heath, TX (US)

( * ) Notice: Subject to any disclaimer, the term of this patent is extended or adjusted under 35 U.S.C. 154(b) by 0 days.

(21) Appl. No.: 16/599,597

(22) Filed: Oct. 11, 2019

(51) Int. Cl.
*A47B 96/00* (2006.01)
*A47B 96/02* (2006.01)

(52) U.S. Cl.
CPC .......... *A47B 96/024* (2013.01); *A47B 96/021* (2013.01)

(58) Field of Classification Search
CPC ... A47B 96/024; A47B 96/021; A47B 96/068; A47B 57/545; A47B 57/04; A47B 57/40; A47B 57/20; A47B 57/26; A47B 47/0083; A47F 5/0037; A47F 5/12; A47F 5/16; A47F 5/101; A47F 2005/165; A47F 1/12; A47F 5/0876; Y10T 403/7094; F16B 5/0052
USPC ............ 312/351, 408, 35, 72; 211/175, 187, 211/90.03, 90.02, 190, 103, 134, 150, 211/90.04; 108/106, 107, 109, 110, 60, 108/61; 248/221.3, 222.1, 220.21, 224.8, 248/225.11, 225.21; 403/381
See application file for complete search history.

(56) References Cited

U.S. PATENT DOCUMENTS

| | | | | |
|---|---|---|---|---|
| 1,952,111 A | * | 3/1934 | Bales | A47B 57/425 108/107 |
| 2,623,641 A | * | 12/1952 | Shield | A47F 1/12 211/59.2 |
| 3,040,904 A | * | 6/1962 | St. Amour | A47B 57/04 108/1 |
| 3,900,112 A | * | 8/1975 | Azzi | B65G 1/023 211/187 |
| 4,146,140 A | * | 3/1979 | Suter | A47B 57/42 108/109 |
| 4,453,641 A | * | 6/1984 | Rasmussen | A47F 1/12 211/151 |
| 4,542,702 A | * | 9/1985 | Johansson | A47B 57/485 108/109 |
| 5,601,038 A | * | 2/1997 | Welch | A47B 55/02 108/107 |
| 5,797,502 A | * | 8/1998 | Brady | A47F 1/12 108/107 |
| 6,332,547 B1 | * | 12/2001 | Shaw | A47F 1/12 211/59.2 |

(Continued)

FOREIGN PATENT DOCUMENTS

| | | | |
|---|---|---|---|
| DE | 102012101421 | * | 8/2013 |
| FR | 2862504 | * | 5/2005 |
| WO | 0016658 | * | 3/2000 |

*Primary Examiner* — Janet M Wilkens
(74) *Attorney, Agent, or Firm* — Baker Law; John Baker; Jeffrey Roddy

(57) ABSTRACT

A shelving assembly includes upright supports configured to support shelf units. The shelf units are height and angularly adjustable by way of an upright-mountable jack assembly. The shelves are supported by pivotable clip members that are removably mounted to slots formed in the upright supports. The assembly includes dividers that may be longitudinally attached to the shelf units. The dividers include a riser portion that separates adjacent packaged merchandise and a glide portion over which the packaged merchandise slides. Multiple slope angles are obtainable by jacking at least one end of a shelf unit, repositioning the clip members, and lowering the shelf unit to reengage with the clip members.

6 Claims, 15 Drawing Sheets

(56) References Cited

U.S. PATENT DOCUMENTS

| | | | | |
|---|---|---|---|---|
| 6,886,699 B2* | 5/2005 | Johnson | ............... | A47F 1/126 |
| | | | | 108/61 |
| 7,258,241 B2* | 8/2007 | Reid | ............... | B65G 1/1373 |
| | | | | 211/103 |
| 7,967,705 B2* | 6/2011 | Connerley | ............ | A63B 71/023 |
| | | | | 473/481 |
| 8,251,233 B1* | 8/2012 | Biglow | ............... | A47F 5/101 |
| | | | | 211/187 |
| 9,357,840 B2* | 6/2016 | Davis | ............... | A47B 57/04 |
| 2004/0099619 A1* | 5/2004 | Bustos | ............... | A47F 5/0056 |
| | | | | 211/59.2 |
| 2007/0132350 A1* | 6/2007 | Kim | ............... | A47B 96/068 |
| | | | | 312/408 |
| 2009/0158572 A1* | 6/2009 | Connerley | ............ | B62B 3/108 |
| | | | | 29/426.1 |
| 2012/0087767 A1* | 4/2012 | Cadoret | ............... | B65G 65/00 |
| | | | | 414/403 |
| 2012/0187065 A1* | 7/2012 | Song | ............... | A47B 55/00 |
| | | | | 211/191 |
| 2013/0161277 A1* | 6/2013 | Augsburger | ....... | H05K 7/20727 |
| | | | | 211/175 |
| 2015/0198281 A1* | 7/2015 | Ticknor | ............... | A01G 20/43 |
| | | | | 211/1.57 |
| 2016/0016769 A1* | 1/2016 | Embleton | ............... | B66F 3/46 |
| | | | | 254/9 R |

* cited by examiner

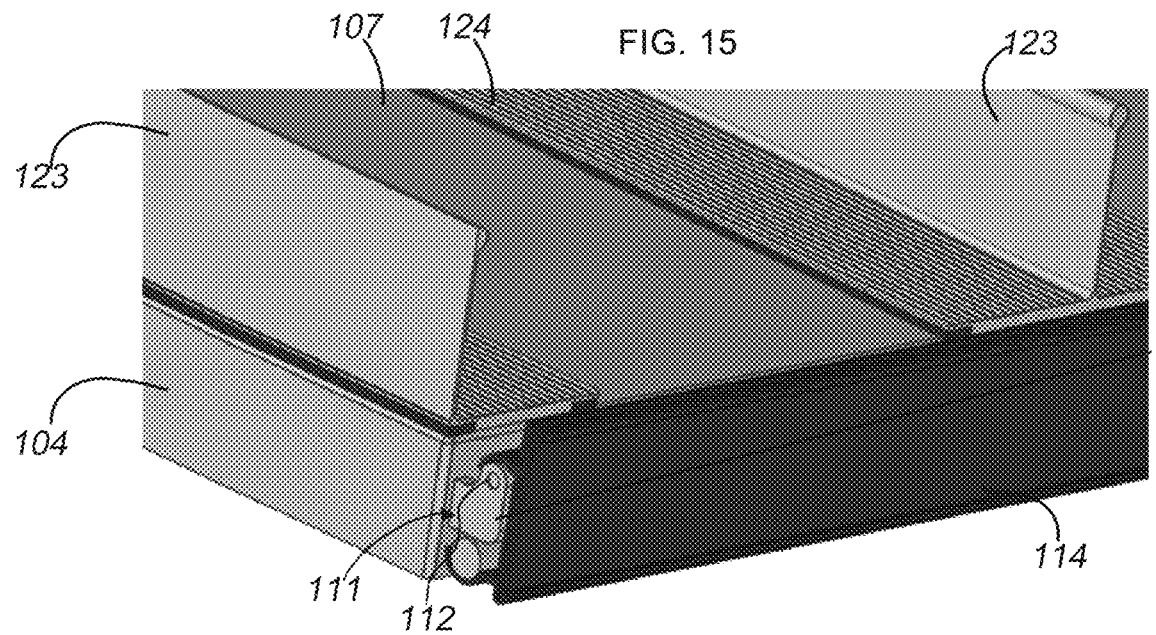
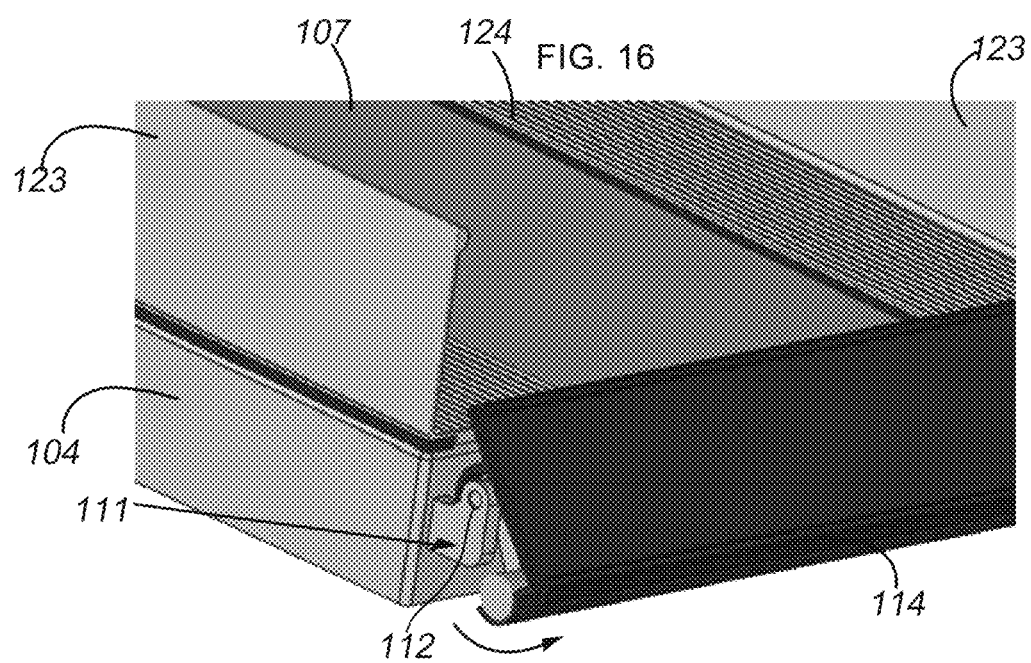

HEIGHT AND ANGLE ADJUSTABLE COMMERCIAL SHELVING

TECHNICAL FIELD

The invention relates generally to supports for stocking, storage and distribution of merchandise.

BACKGROUND

Angled shelving for merchandise is long known in the art. However, re-configuring shelving assemblies to provide for different merchandise; for example, raising, lowering or changing the incline of shelves, is typically problematic and involves much time and expense.

It would be desirable to provide a merchandise assembly that is readily reconfigured without removing the merchandise from the shelves.

SUMMARY

In a general aspect of the present invention, a commercial shelving assembly is configured to support stock or merchandise on shelving units, the shelf units of which may be angled such that when a unit of merchandise is removed from a stack, the entire stack of merchandise may move forward. Each shelf unit is coupled to upright supports by pivotable clip members. Shelf units in the assembly can be raised, lowered or angularly modified without removing heavy merchandise from the shelves with the use of an upright-mountable jack platform. Clip members supporting the shelf units are insertable into slot cut-out sections located on the upright supports. The clip members have a head portion inserted into the slot and a hook portion that engages with frame portions of the shelf units. Because the inserted clip members are pivotable, the shelf units may be readily pivoted by disengaging the shelf unit from some supporting clip members. Merchandise dividers function as a separator to maintain separation of the columns of merchandise and include a riser portion disposed between the adjacent columns of merchandise and a glide portion atop which the merchandise rests and slides by gravity. Typically, the dividers include a magnetic portion for attachment to the shelf units.

In an aspect combinable with the general implementation, the shelving assembly includes one or more shelf units with a structural framework.

In an aspect combinable with any other aspect, the shelving assembly includes at least two uprights.

In an aspect combinable with any other aspect, uprights of the shelving assembly may include a plurality angled slots.

In an aspect combinable with any other aspect, the shelving assembly includes a plurality of clip members.

In an aspect combinable with any other aspect, slots of the shelving assembly are configured to receive a slot engagement portion of the clip members.

In an aspect combinable with any other aspect, the shelving assembly includes a stop member at one end of the shelf unit to arrest the momentum of sliding merchandise and to lift the leading end of the merchandise package, facilitating easy removal from the stack.

Other advantages of the present invention will become apparent from the following descriptions, taken in connection with the accompanying drawings wherein by way of illustration and example, preferred embodiments of the present invention are disclosed.

BRIEF DESCRIPTION OF THE DRAWING FIGURES

FIG. 15 is another enlarged partial view of a shelf unit end with pivotable price rail bracket;

FIG. 16 is another enlarged partial view of a shelf unit end with pivotable price rail bracket—pivoted up;

Figure 1:
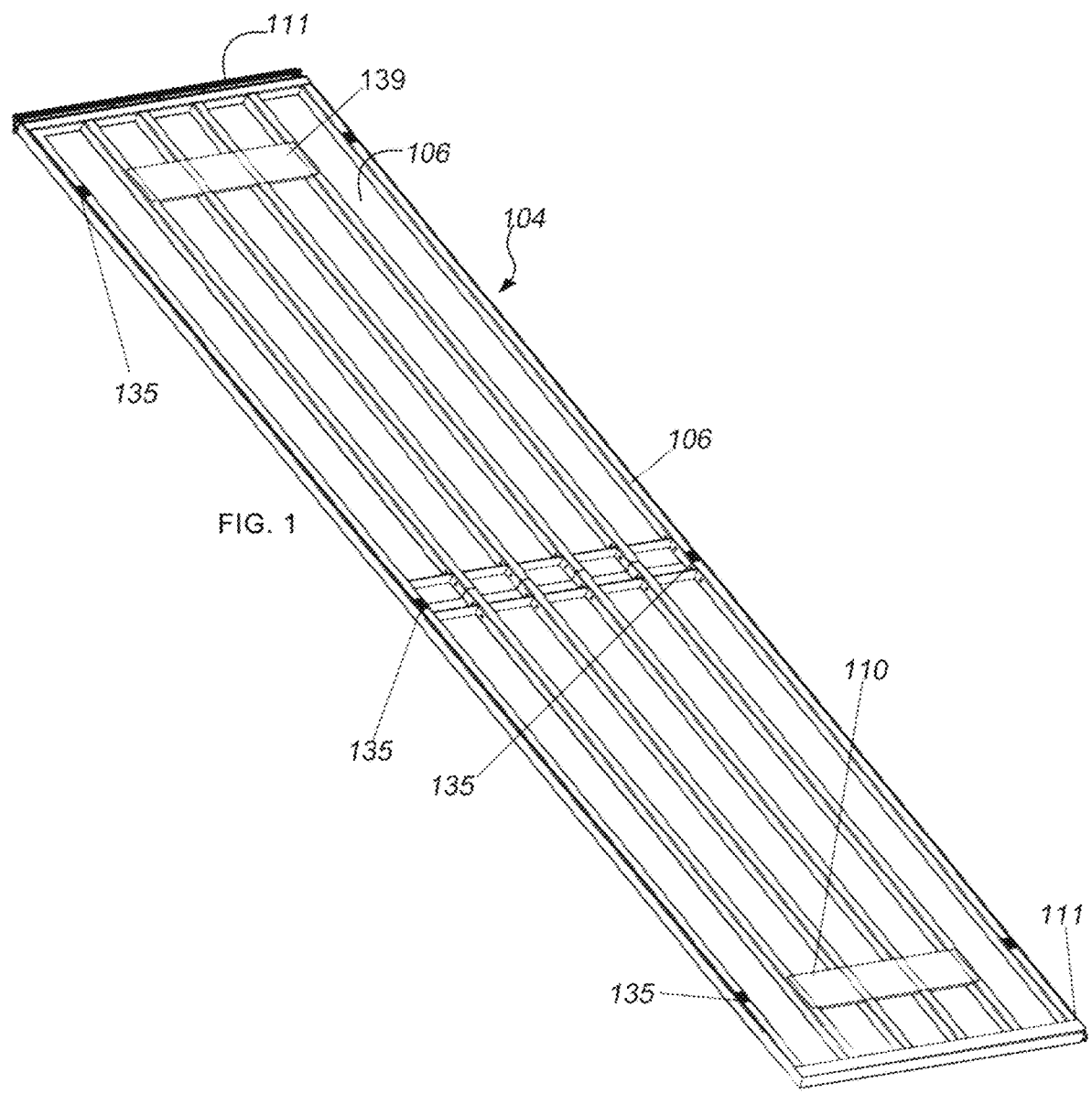
FIG. 1 is an isometric view of a bottom side of a shelf in one example implementation of a shelving assembly according to the present invention.

REFERENCE TO THE NUMBERED ELEMENTS 100 frame assembly
104 shelf unit
106 shelf unit bottom
107 shelf unit top
108 shelf unit frame
111 price rail bracket
112 price rail pivot
113 pivot plate
114 price rail cover
116 divider alignment strip
117 stop
122 divider
123 riser portion
124 glide portion
125 magnetic portion
126 upright
128 slot member
129 slot markings
130 T-section
132 clip member
133*a* clip head
133*b* clip hook
134 cross brace
135 clip engagement portion
136 jack assembly
138 mountable jack platform 139 jack pad
140 jack handle
144 jack
145 jack pillar
146 jack plate
200 stock Definitions In the following description, unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references listed in this disclosure are incorporated by reference in their entirety for all purposes. In case of conflict, the present specification, including explanations of terms, will control. In addition, the materials, methods, and examples are illustrative only and not intended to be limiting.

DETAILED DESCRIPTION OF THE EMBODIMENTS

Referring generally to FIGS. 1-17 a shelving assembly (100) includes a structure comprising at least two uprights (126) at least one shelf unit (104). The assembly may have a plurality of cross-braces (134) or struts that connect the uprights and provide structural stability. The shelf units have a top side (107) a bottom side (106) and a framework (108) that may include welded steel channel. Certain portions (135) of the shelf units (e.g., framework portions) are configured to engage with high strength steel clip members (132) that are themselves engageable with slots (128) formed in the uprights (126). Typically, slots (128) are numbered (129) so that parallelism between slots on adjacent uprights may be determined for the placement of the clip members (132) and transverse the shelf units (104). The clip members (132) include a head portion (133a) that may be placed in slots (128) and an exposed hook portion (133b) adapted to engage with portions (135) of each shelf unit (104). The shelf units (104) include pivotable (112) price rail brackets (111) over which a price rail cover (114) may be mounted. Raising or lowering the shelf units (104) may be accomplished by using the jack assembly (136) that includes a platform (138) that may be mounted; typically engaged with upright slots (128) such that the platform bridges the width of a given shelf unit. A jack (144) is mounted to the platform and by pumping the jack handle, jack plate (146) is brought into contact with a jack pad (139) mounted to the bottom side of a shelf unit (104). Accordingly, in order to raise a shelf or to adjust the shelf angle, one end of a shelf unit is raised by jacking and the clips (132) nearest the jack assembly (136) are removed and repositioned either relatively lower or higher on the uprights (126). The shelf unit (104) may then be lowered into place, the jack assembly removed and remounted at the opposite end of the assembly and the same operation performed for the other end of the shelf unit.

Figure 2:
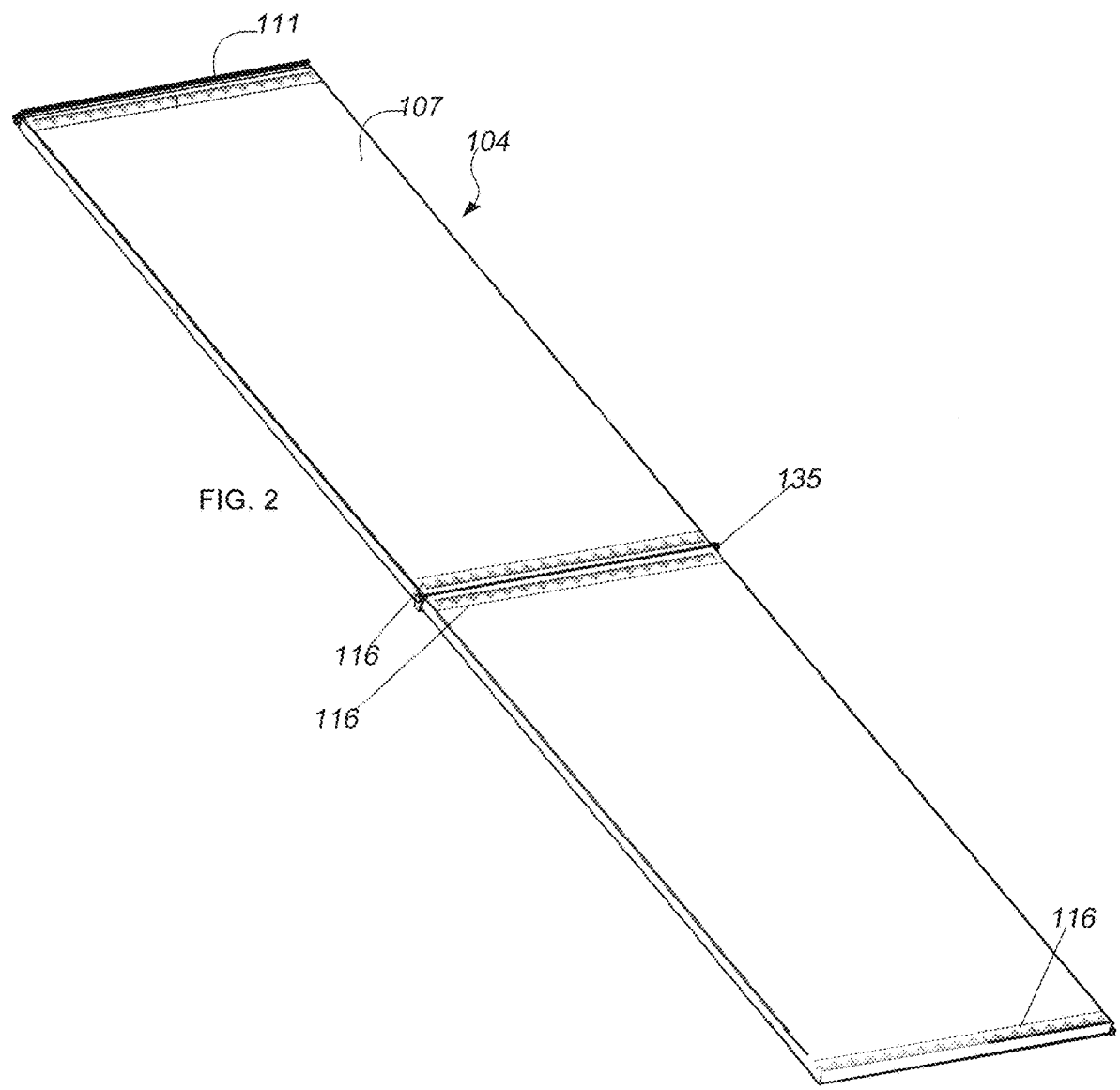
FIG. 2 is an isometric view of a top side thereof.

FIGS. 1 and 2 show respectively a bottom-side (106) and top-side (107) of a shelf unit (104). In some implementations, framework (108) is positioned on the bottom-side. In some implementations, attachable alignment guides (116) with ruled lines facilitate the mounting and even spacing of dividers (122) that are magnetically (125) attachable to the top-side of the shelf unit (104). In some implementations, certain portions of the framework (108) which may be square channel tubing, are adapted to engage with a hook portion (133b) of clip members (132). The shelf units may be any dimension (e.g., 8-12 feet in length and 24-30 inches wide) and symmetrical and reversible. Pivotable price rail brackets (111) are mountable or mounted to the ends of the shelf units (104). The pivotable price rail brackets at each end of the shelf units are configured to receive a price rail cover (114) that is translucent and includes a space for paper stock pricing and offers, etc., to be be place inside.

Figure 3:
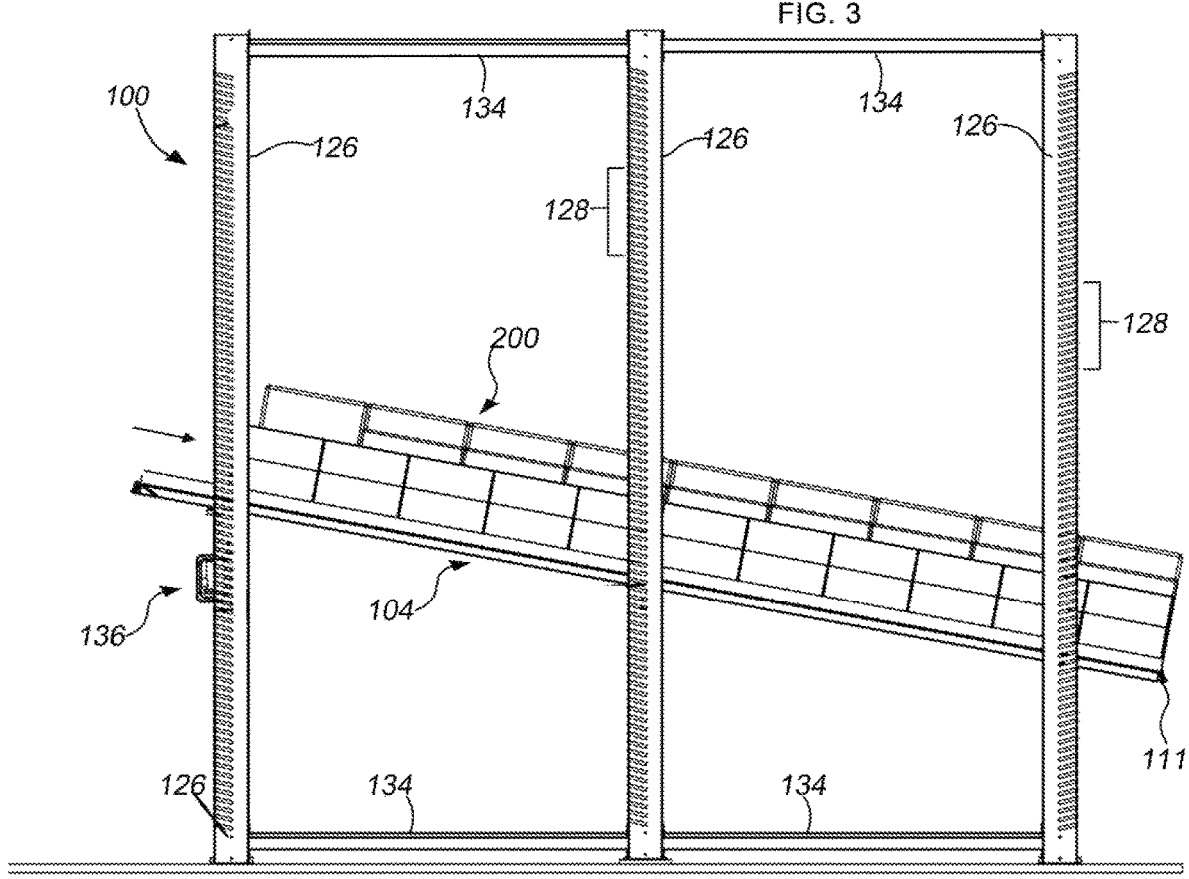
FIG. 3 is a side elevation showing an example implementation of a shelving assembly.

FIG. 3 shows an example implementation of a shelving assembly (100) with a shelf unit (104) mounted to slotted (128) uprights (126). The shelf unit (104) shown is loaded with merchandise (200) and angled such that the merchandise is able to slide to the lower end. Dividers (122) include a riser (123) that separates columns of merchandise and a glide portion (124) that includes silicone impregnated ribbed strips over which the merchandise readily slides.

Figure 4:
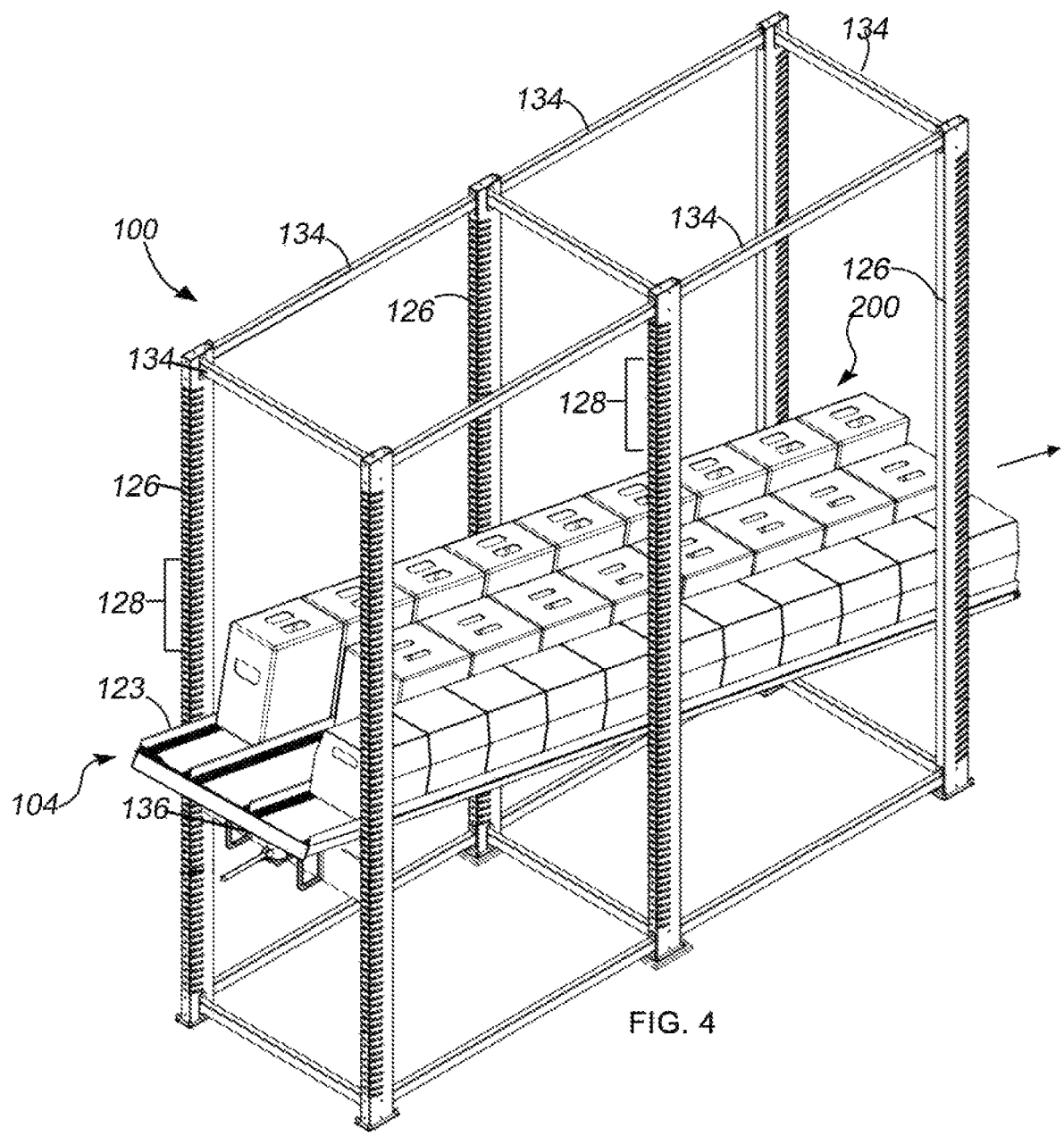
FIG. 4 is an isometric view thereof.
Figure 5:
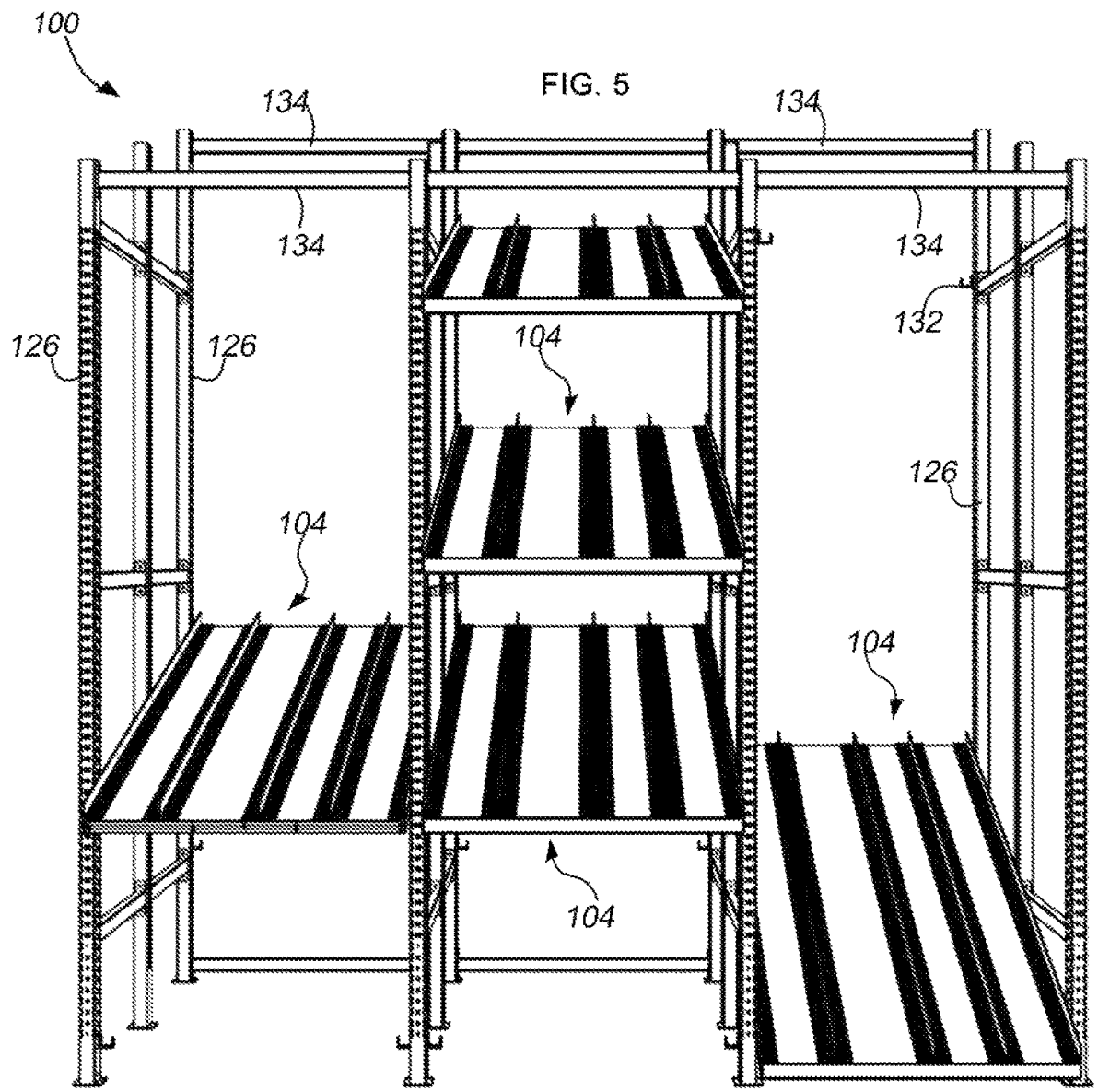
FIG. 5 is a front-side elevation thereof.
Figure 6:
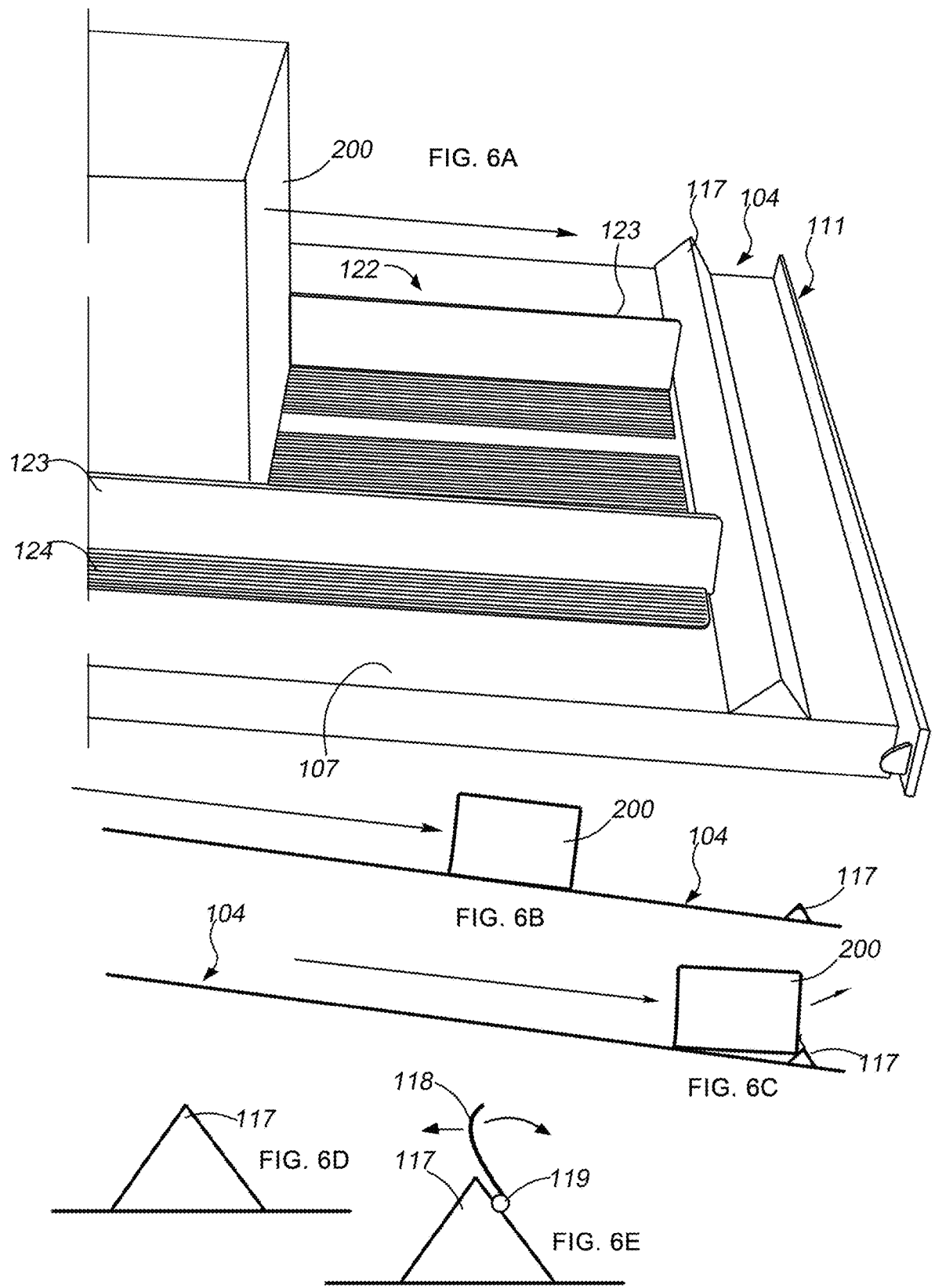
FIG. 6A is an partial view of a shelf with installed dividers and a product stop member.
FIGS. 6B and 6C are diagrammatic views of a shelf with a stop member.
FIGS. 6D and 6E are diagrammatic views of stop members.

FIG. 4 is a front-side elevation of another example implementation that includes 5 shelf units (104) and shows dividers (122) mounted to the top-sides of the shelf units.

FIG. 6A is an enlarged partial view of a shelf unit (104) with installed dividers and a product stop member (117). When the stock slides forward along the glide portions (124) of the dividers (122) (FIGS. 8 and 9), to one end of the shelf unit by gravity, the stop member (117) (FIGS. 6B, 6C) both arrests the forward motion and raises the forward bottom lip of the merchandise package (200) such that the package may be more easily grasped by a worker or consumer and which has the effect of relieving the back pressure of the mass of remaining packages that would otherwise be bearing on the forward most package.

FIGS. 6D and 6E show two example implementations of a stop member (117) mountable to an end of a shelf unit (104). The stop member may be an angled section of metal with or without a subsidiary motion arrest (118) which may include a forwardly biased spring member (119).

Figure 7:
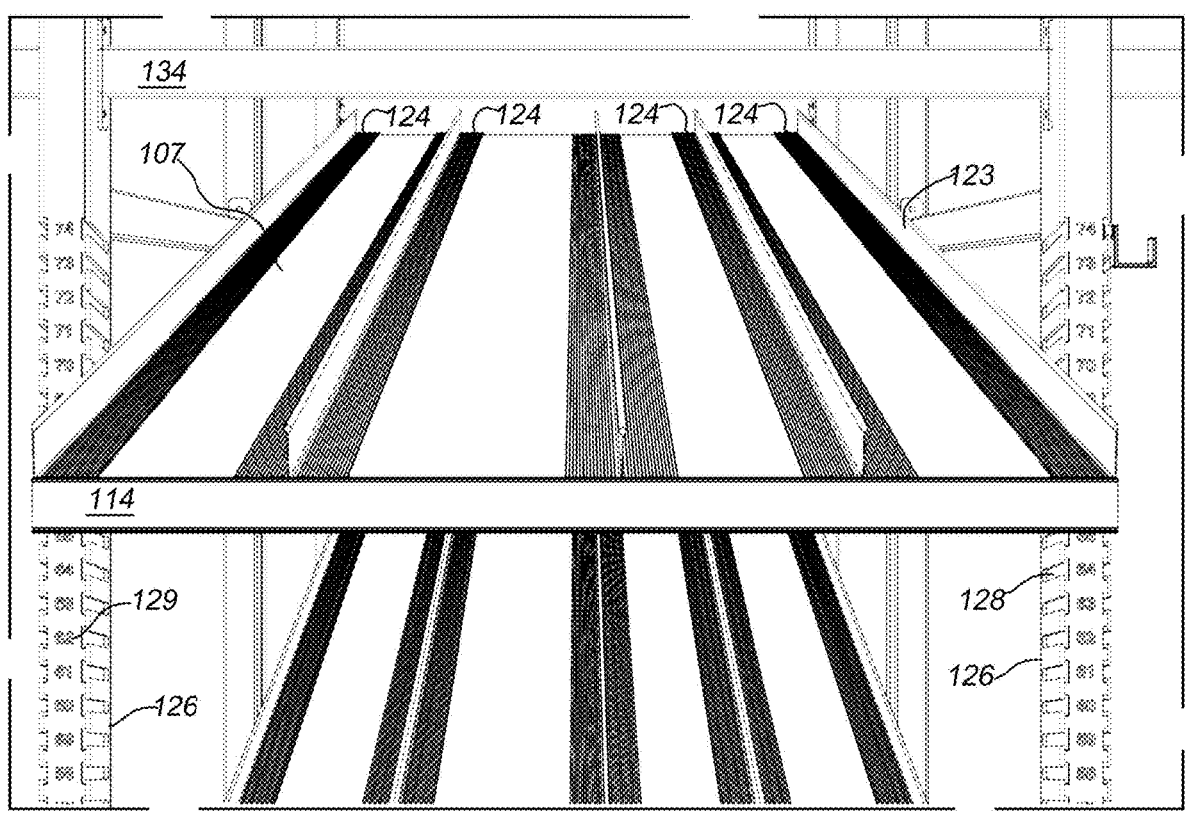
FIG. 7 is a partial front-side elevation of the shelving assembly.

FIG. 7 is a partial front-side elevation of an example implementation that shows a shelf unit (104) mounted between uprights (126). Dividers (122) are shown longitudinally spaced. A price rail bracket with cover (114) is mounted to the ends of the shelf unit (104).

Figure 8:
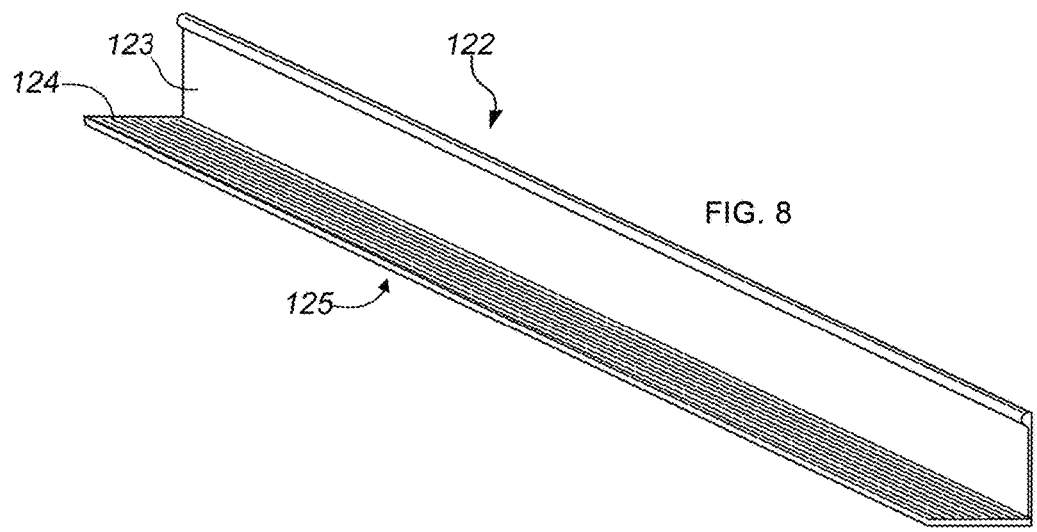
FIGS. 8 and 9 are isometric views showing respectively, an L-shaped divider and a T-shaped divider.
Figure 9:
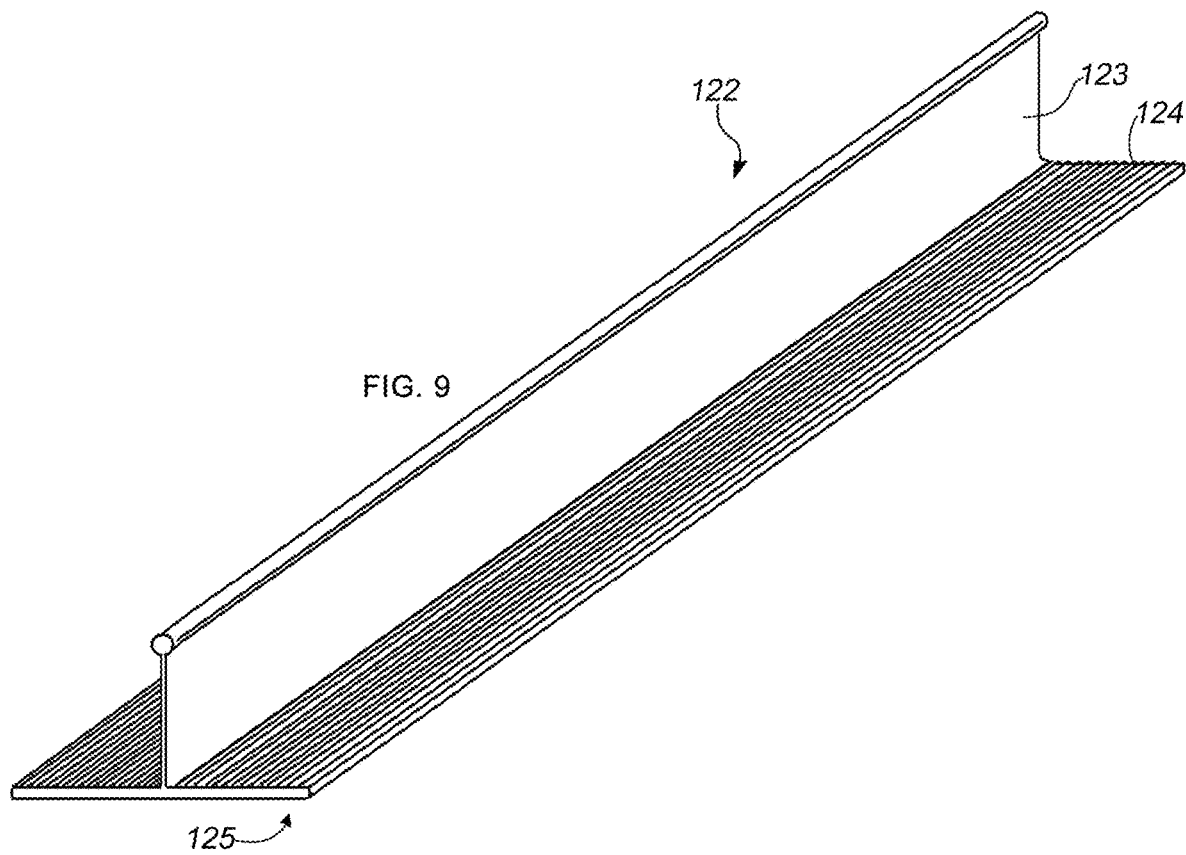

FIGS. 8 and 9 show example implementations of a divider (122) that includes a riser portion (123) adapted to separate packages of merchandise and a ribbed glide portion (124) over which the packages slide. The risers are typically capped by a protruding section to minimize friction between the riser and the packages. Dividers typically includes a magnetic strip (125) under the glide portions (124) whereby the dividers are mounted to the shelf units (104).

Figure 10:
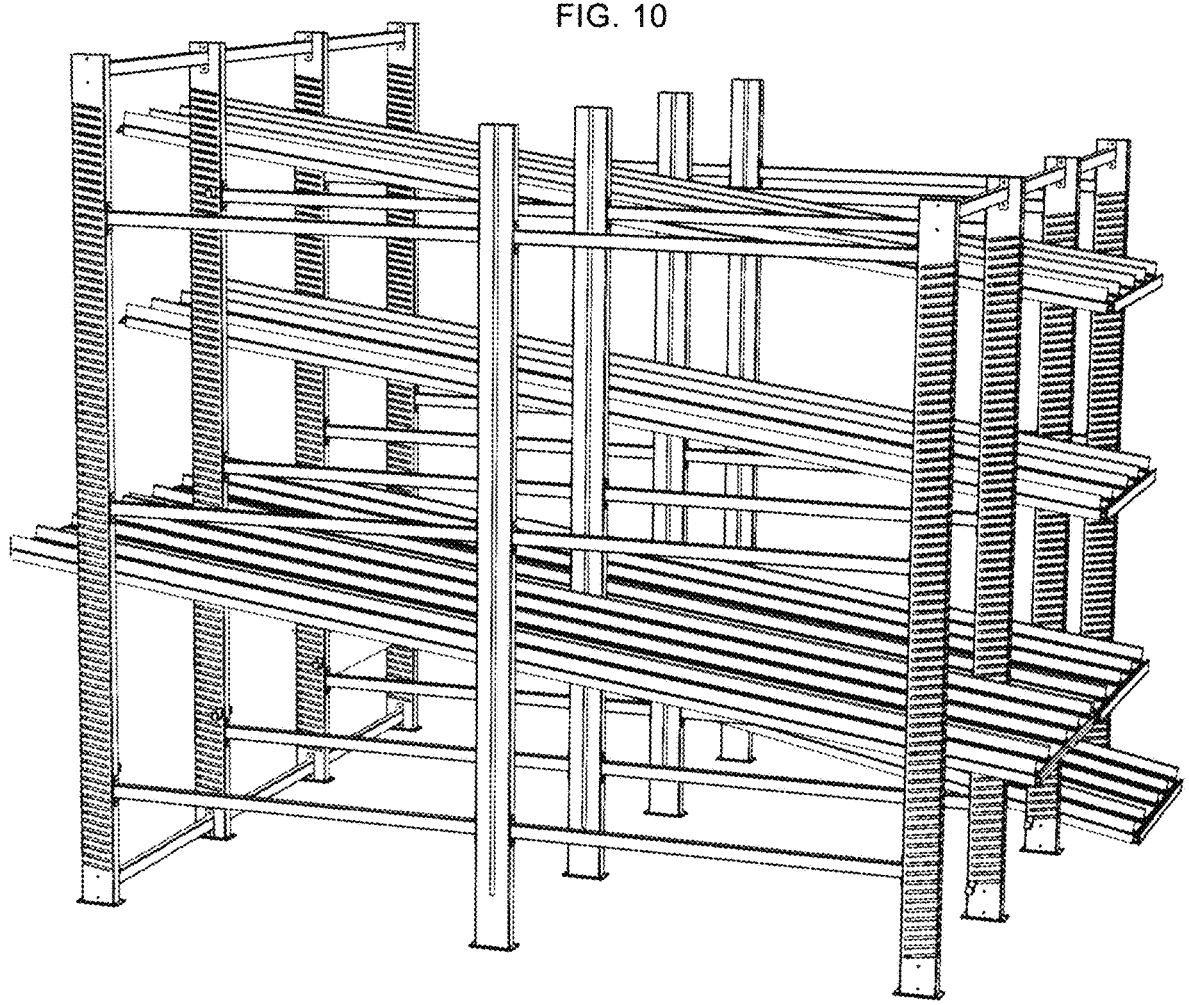
FIG. 10 is an isometric view of one implementation of a shelving assembly.

FIG. 10 is an isometric view of an example implementation with multiple shelf units mounted to the slotted (128) uprights (126).

Figure 11:
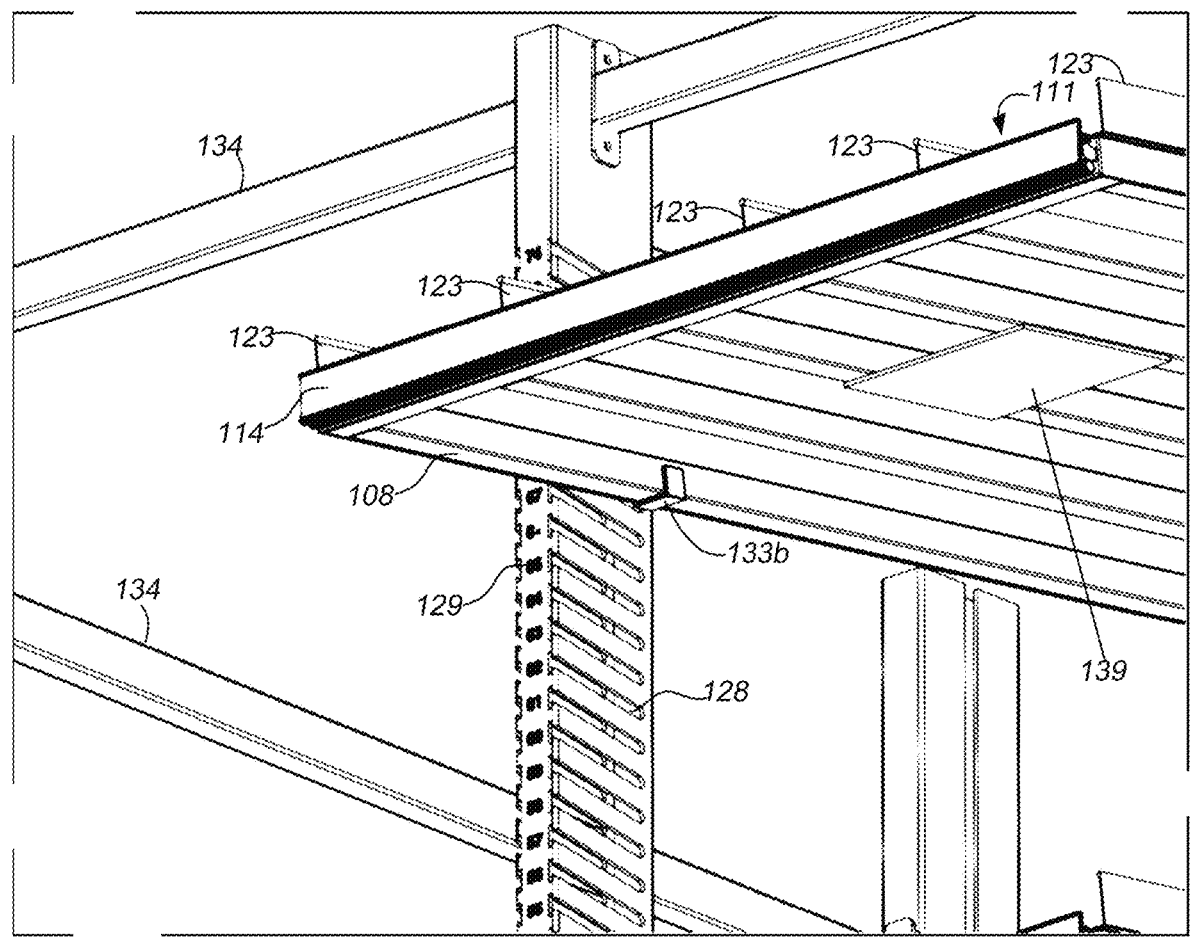
FIG. 11 is a partial view showing the underside of a shelf unit and upright supports.
Figure 12:
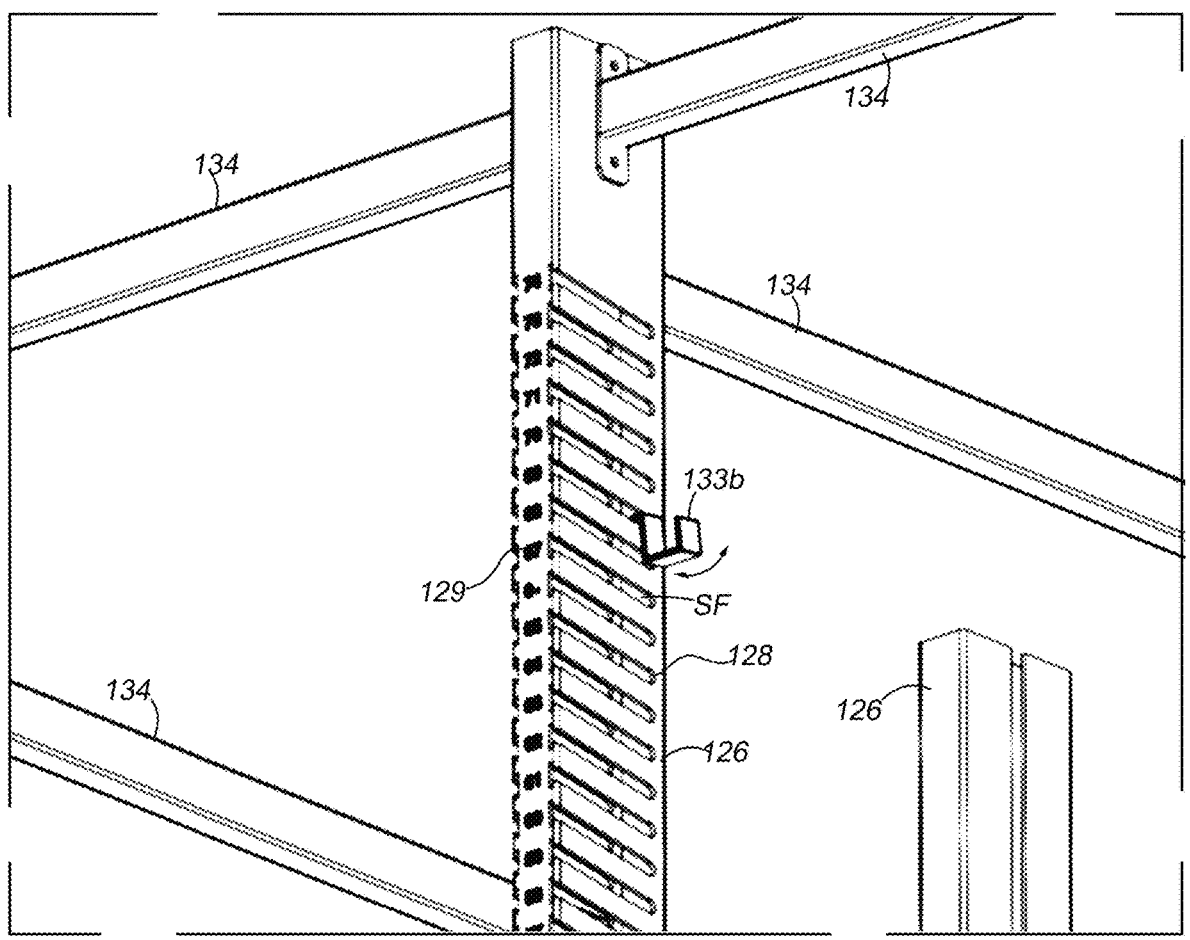
FIG. 12 is a partial view showing the shelf units of (FIG. 11) with the shelf unit removed to show surrounding detail.
Figure 13A:
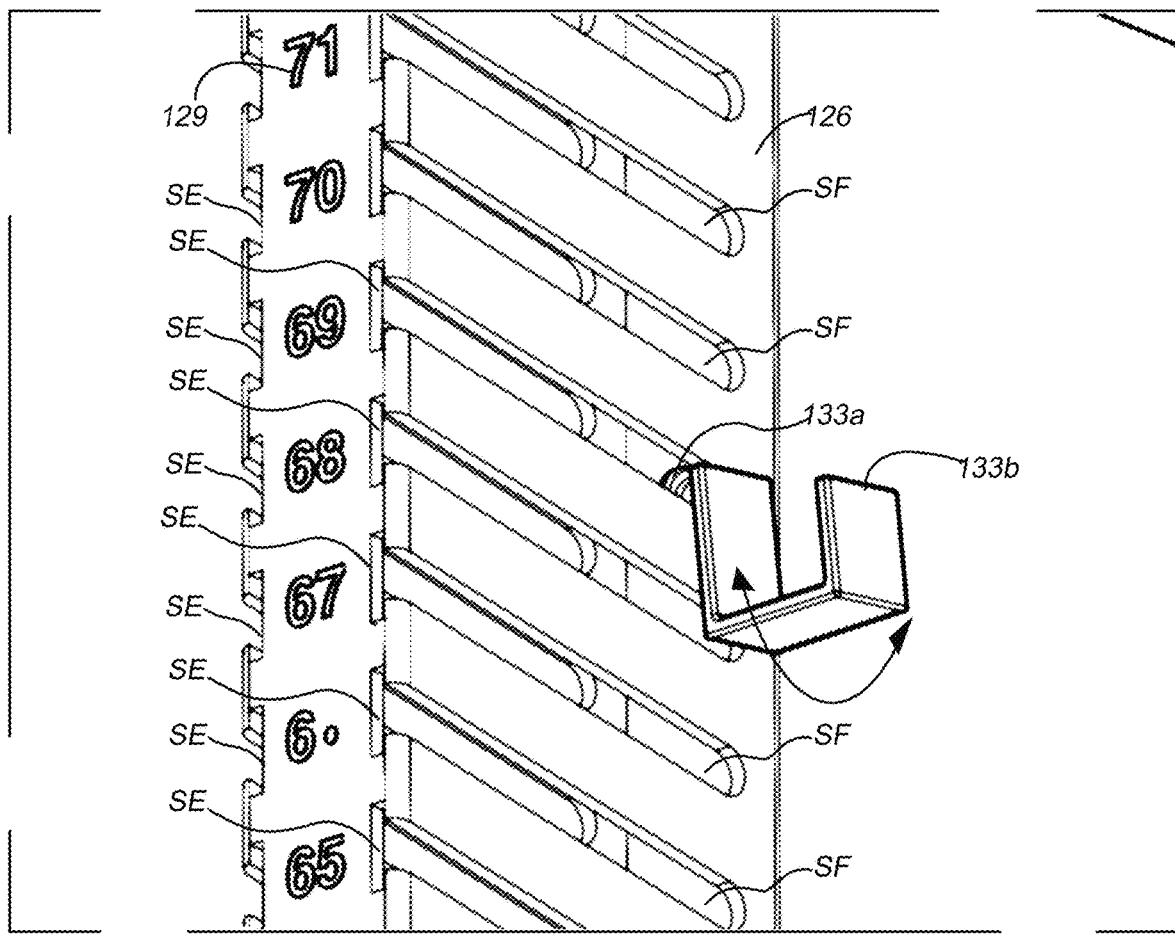
FIGS. 13A and 13B show respectively, an enlarged view of an upright support with slots and an installed clip member, and, clip member (132)
Figure 13B:
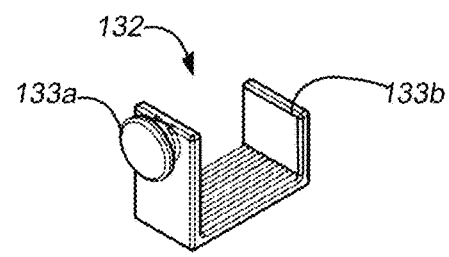

FIG. 11 is an enlarged partial view of a section of the shelving assembly (100) showing shelf unit (104) engaged with the exposed hook portion (133b) of clip member (132). In FIG. 12 the shelf unit has been removed to better show the clip member (132) that is pivotable when inserted into slot (128). FIG. 13A is a further enlarged view showing the relationship of the clip member and slot (128). Clip members (132) are inserted into slot entry point (SE) that may be T-shaped and slid to the rear of the slot where a head portion (133*a*) is maintained between slot face (SF) and the outer portions of the upright (126) where sufficient tolerance exists to allow the head portion and hook portion to pivot. Accordingly, when the shelf is raised at one end, the structural elements of the shelf unit remain engaged with the clip member throughout the repositioning operation. FIG. 13B shows a clip member (132) with head portion (133*a*) and hook portion (133*b*).

Figure 14:
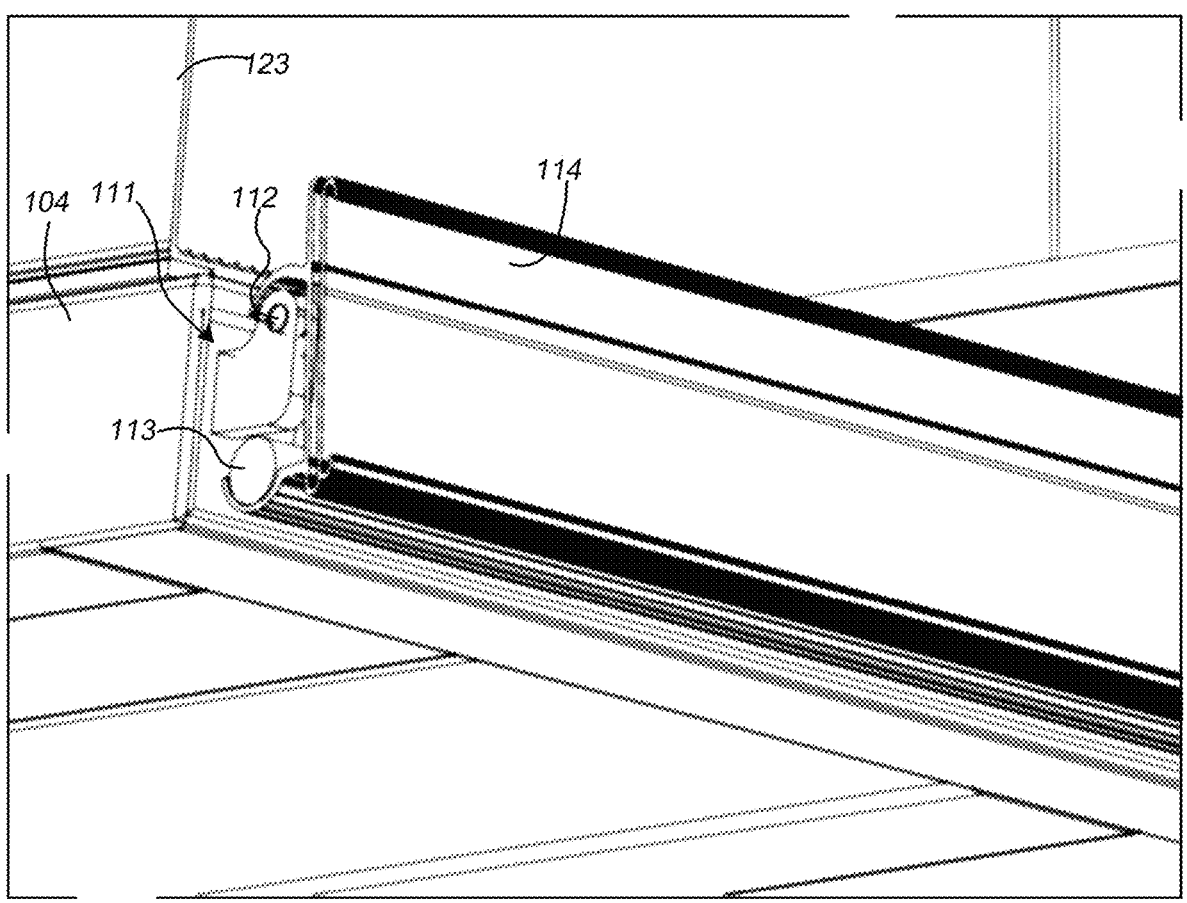
FIG. 14 is an enlarged partial view of a shelf unit end with pivotable price rail bracket.

FIG. 14 is an enlarged partial view of an implementation showing one end of a price rail bracket (111) that includes a fixed portion and a pivot plate (113) joined to the fixed portion by pivot (112). Cover (114) is removably attachable to the pivot plate (113). Cover (114) is typically see-through resilient plastic and includes a gap (g) into which price information may be placed. Cover (114) also includes outside upper and lower lips (ul, ll) that may serve to hold supplemental pricing, etc. FIGS. 15 and 16 show cover (114) in a non-pivoted and outwardly pivoted position. It should be understood that tension may be adjusted such that pivot plate (113) is tensioned around with pivot pin (112) and cover (114) may maintain a position when manually pivoted. Alternately, tension if low enough, the cover may freely pivot according to the shelf angle and by gravity alone.

Figure 17:
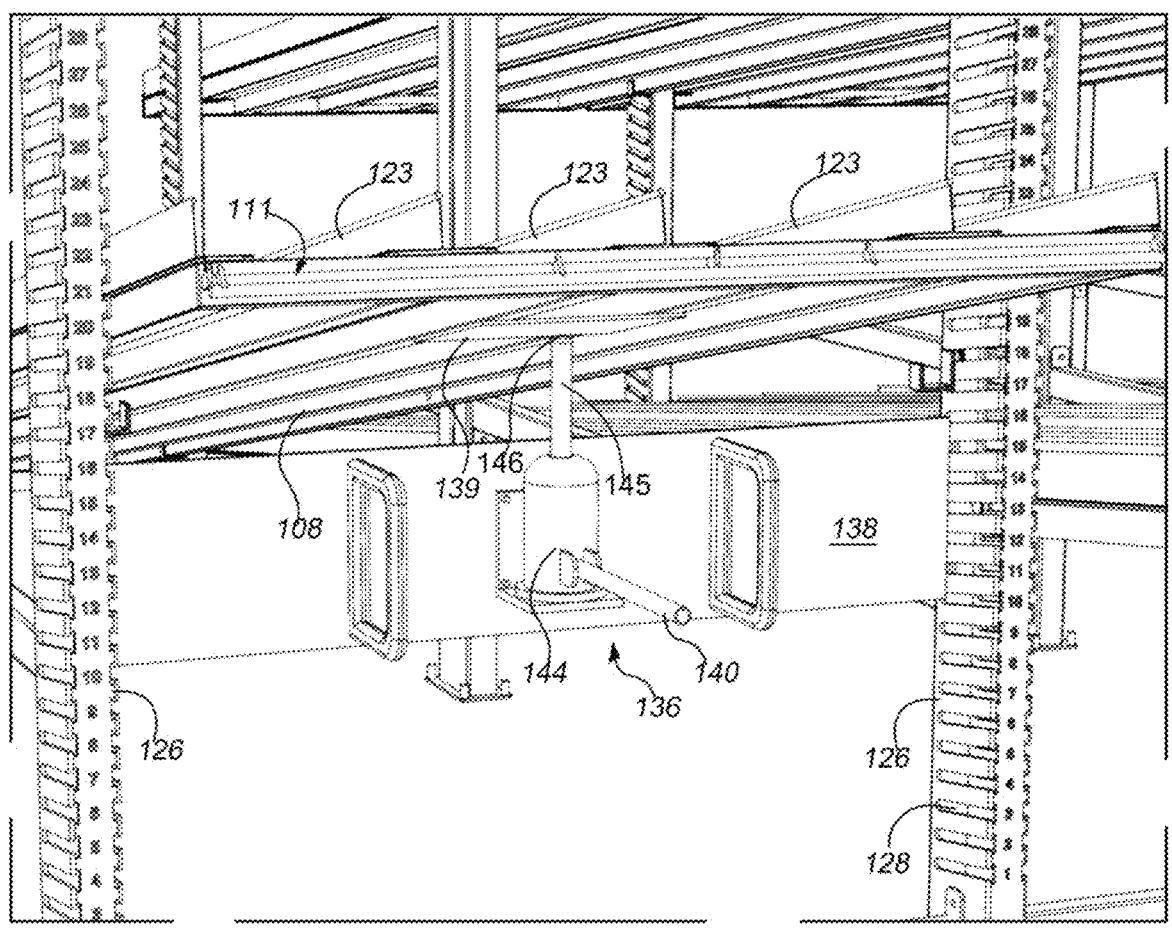
FIG. 17 is an enlarged partial view of a shelf unit end showing a jack member installed.

FIG. 17 shows a jack assembly (136) mounted between a pair of uprights (126) and beneath a shelf unit (104). Jack (144) may be a hydraulic type or a mechanical type jack. When handle (140) is moved up and down, it causes pillar (145) to rise and jack plate (146) to contact jack pad (139) of the shelf unit (104). In the illustration shown, the shelf unit has already been raised, separating the lifted end away from the clip members (132) that can then be repositioned. Jack platform (138) is typically a panel having ends that engage in a similar fashion as the clip head portions (133*a*) with slots (128) of uprights (126). Accordingly, using the upright mountable jack assembly, it is possible to reposition (raise, loser, angularly reposition) partially or fully loaded shelf units.

In accordance with the various implementations described, advantages of the present invention include but are not limited to the ability to achieve any flow-angle for a shelf unit (104); shelf units that are repositionable by store personnel; marked or numbered slots to identify parallelism of slots (128) on adjacent uprights (126); easy repositioning of magnetically (125) attachable dividers (122) to a shelf unit (104); divider glide portions (124) that channel leaks that may occur from damaged packaging via the ribbed portions; symmetrical structural elements; alignment guides/attachable indicia (116) to assist in even placement of dividers (122); readily repositionable and upright (126) mountable jack assembly (136); and, same length crossbraces.

Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A shelving assembly comprising:
   at least four upright supports, the upright supports include a series of angled slots and markings to identify each of the series of angled slots on an upright for parallelism relative to another slot on an adjacent upright;
   a plurality of clip members, each clip member includes a head portion and a j-shaped portion, the head portion is configured to slide into a slot from the angled slots and to pivot therein;
   at least one shelf unit, the at least one shelf unit includes a platform with portions configured to engage the j-shaped portion of the clip members;
   the at least one shelf unit is pivotable and is capable of being secured in an angled position; and a repositionable jack platform including a jack to raise or lower a shelf end, the jack platform removably engageable with the slots of at least two of the upright supports.

2. The shelving assembly according to claim 1 further comprising at least one divider with a glide portion attachable to the at least one shelf unit.

3. The shelving assembly according to claim 1 where the clip members are pivotable.

4. The shelving assembly according to claim 1 further comprising a stop member.

5. The shelving assembly according to claim 1 further comprising at least two alignment members attachable to the at least one shelf unit.

6. The shelving assembly according to claim 1 further comprising a pivotable price bracket and rail.

* * * * *